(12) United States Patent
Baldwin et al.

(10) Patent No.: US 7,255,191 B2
(45) Date of Patent: Aug. 14, 2007

(54) COMPOSITE CONSTRUCTION VEHICLE FRAME

(75) Inventors: James Daniel Baldwin, Pawtucket, RI (US); Steven R. Cox, Tiverton, RI (US); Peter S. Hughes, South Harwich, MA (US)

(73) Assignee: Vectrix Corporation, Newport, RI (US)

( * ) Notice: Subject to any disclaimer, the term of this patent is extended or adjusted under 35 U.S.C. 154(b) by 0 days.

(21) Appl. No.: 10/697,871

(22) Filed: Oct. 31, 2003

(65) Prior Publication Data

US 2005/0092538 A1    May 5, 2005

(51) Int. Cl.
B62D 21/08  (2006.01)
(52) U.S. Cl. ...................... 180/220; 180/312
(58) Field of Classification Search ............. 180/6.5, 180/65.1–65.3, 219, 220, 311, 312
See application file for complete search history.

(56) References Cited

U.S. PATENT DOCUMENTS

| | | | |
|---|---|---|---|
| 3,983,952 A | 10/1976 | McKee | 180/55 |
| 4,334,589 A | 6/1982 | Asakura et al. | 180/219 |
| 4,557,345 A | 12/1985 | Hamane et al. | 180/229 |
| 4,577,719 A | 3/1986 | Nomura et al. | 180/219 |
| 4,678,223 A | 7/1987 | Kishi et al. | 290/78 |
| 4,700,795 A | 10/1987 | Yashima et al. | 180/68.5 |
| 4,700,799 A | 10/1987 | Kawano | 180/219 |
| 4,715,465 A | 12/1987 | Takahashi et al. | 180/225 |
| 4,721,178 A | 1/1988 | Ito | 180/215 |
| 4,723,619 A | 2/1988 | Yamamoto et al. | 180/219 |
| 4,726,439 A | 2/1988 | Iwao et al. | 180/219 |
| 4,781,264 A | 11/1988 | Matsuzaki et al. | 180/219 |
| 4,800,980 A | 1/1989 | Hideo et al. | 180/225 |
| 4,830,134 A | 5/1989 | Hashimoto | 180/219 |
| 4,830,135 A | 5/1989 | Yamashita | 180/229 |
| 4,887,687 A | 12/1989 | Asai et al. | 180/219 |
| 4,915,188 A * | 4/1990 | Ota et al. | 180/219 |
| 4,964,484 A | 10/1990 | Buell | 180/219 |
| 4,989,665 A | 2/1991 | Yamagiwa et al. | 164/363 |
| 5,020,847 A | 6/1991 | Shih | 296/204 |
| 5,179,868 A | 1/1993 | Thibeault | 74/411 |
| 5,207,288 A | 5/1993 | Ono | 180/220 |
| 5,238,267 A | 8/1993 | Hutchison et al. | 280/781 |
| 5,375,677 A | 12/1994 | Yamagiwa et al. | 180/219 |
| 5,421,427 A * | 6/1995 | Ogawa et al. | 180/220 |
| 5,433,286 A * | 7/1995 | Kumamaru et al. | 180/219 |

(Continued)

FOREIGN PATENT DOCUMENTS

| | | | |
|---|---|---|---|
| JP | 0311975 | 12/1989 | 180/311 |
| JP | 0155885 | 6/1990 | 180/311 |

*Primary Examiner*—Kevin Hurley
(74) *Attorney, Agent, or Firm*—Winston & Strawn LLP

(57) ABSTRACT

A vehicle frame that includes first and second frame portions. The first frame portion has a plurality of struts associated with each other to form a first framework. The second frame portion is associable with the first frame portion in a stiffening association for significantly increasing the stiffness of the first frame portion. The associated first and second frame portions are configured to support a rider sitting on the vehicle frame. The associated frame portions also define an interior cavity dimension for housing a component of the propulsion system for propelling the vehicle. The associated frame portions also comprise attachments for supportedly connecting two wheels of the vehicle, a seat disposed on the frame, and other vehicle accessories and systems.

31 Claims, 8 Drawing Sheets

U.S. PATENT DOCUMENTS

| | | | |
|---|---|---|---|
| 5,477,936 A * | 12/1995 | Sugioka et al. | 180/68.5 |
| 5,513,721 A * | 5/1996 | Ogawa et al. | 180/220 |
| 5,577,747 A | 11/1996 | Ogawa et al. | 180/220 |
| 5,613,569 A | 3/1997 | Sugioka et al. | 180/68 |
| 5,647,450 A | 7/1997 | Ogawa et al. | 180/220 |
| 5,657,830 A | 8/1997 | Kawashima et al. | 180/220 |
| 5,715,904 A | 2/1998 | Takahashi et al. | 180/229 |
| 5,743,347 A | 4/1998 | Gingerich | 180/65 |
| 5,934,694 A | 8/1999 | Schugt et al. | 280/33 |
| 6,047,786 A * | 4/2000 | Stevenson et al. | 180/65.1 |
| 6,073,719 A * | 6/2000 | Ohmika et al. | 180/219 |
| 6,176,338 B1 * | 1/2001 | Nakagawa et al. | 180/219 |
| 6,349,785 B1 | 2/2002 | Ohmika et al. | 180/227 |
| 6,679,345 B2 * | 1/2004 | Hirayama et al. | 180/65.3 |
| 2002/0166709 A1 | 11/2002 | Michisaka et al. | 180/219 |

* cited by examiner

COMPOSITE CONSTRUCTION VEHICLE FRAME

TECHNICAL FIELD OF THE INVENTION

The present invention relates to a vehicle, and more particularly to an electric vehicle frame that has a plurality of subassemblies.

BACKGROUND OF THE INVENTION

Known motor scooters generally include a tubular frame for supporting the components of the vehicle and a power unit. Electric scooters have been developed to reduce the environmental impact of private transportation, especially in crowded cities. Electric scooters are typically powered by a battery pack.

U.S. Pat. No. 5,613,569 teaches a scooter with a tubular frame formed by welding steel pipe members into a unitary, skeletal structure. U.S. Pat. No. 4,334,589 discloses a frame for a motorcycle with a shell type frame, including an upper half shell and lower half shell detachably joined together at the peripheral edges. The upper half shell includes a steering tube for receiving a steering assembly. A conventional gasoline engine is used.

U.S. Pat. No. 6,047,786 teaches an electric vehicle with a frame with an upper and a lower portion that each have integral walls. The two portions are attached to each other to provide a frame assembly that is substantially greater than that of each portion prior to being assembled.

A vehicle frame is needed with decreased weight and ease of construction that can preferably provide easy access to an enclosed interior.

SUMMARY OF THE INVENTION

The present invention relates to a vehicle frame, such as for a scooter, a motorcycle, a four-wheel ATV, and other vehicles, especially in which a rider sits on or straddles the frame. A preferred embodiment of the vehicle frame includes a first frame portion with a plurality of struts that are associated with each other to form a first framework. A second frame portion is associable with the first frame portion in a stiffening association for significantly increasing the stiffness of the first frame portion and for contributing significantly to the overall stiffness of the assembled frame. Preferably, the associated first and second frame portions are configured for supporting a rider sitting thereon, and the associated frame portions define an interior cavity dimensioned for housing, enclosing, and preferably substantially isolating components of the vehicle or portion thereof. The housed components can include, for example, a propulsion system for propelling a vehicle. Additionally, attachments are provided on the preferred frame for connecting two wheels that support the frame, and preferably to connect to a seat disposed on the frame, as well as to other accessories, such as suspension components.

In this embodiment, the first frame portion comprises at least one skin member that is structurally associated with the struts of the framework for closing at least portions, and preferably substantially the entire openings defined between the struts, although openings may be provided for purposes such as ventilation. The skin member of the first frame portion can be configured and associated with the framework for significantly increasing the stiffness thereof and can include a plurality of skins coupled to the framework. Additionally, the first frame portion skin member can include a battery tray that fits inside the interior cavity and is configured for supporting a battery to power the propulsion system.

The battery tray is preferably associated with the first framework for significantly adding to its stiffness. The first and second frame portions can be configured to permit the removal of the battery tray from the frame interior when the first and second frame portions are separated, such as by lifting the tray and possibly also unsnapping or detaching the tray from the framework first. In one embodiment, the struts comprise at least one concave bracket configured for engaging a bottom portion of the tray to support and stabilize the battery tray.

In the preferred frame, a plurality of struts of one or both of the frame portions are connected together to form a rigid framework, and the struts can be welded to each other, cast as a single piece, or otherwise connected to form the rigid framework. In a preferred embodiment, a rear strut set is cast as a single open back wall, and other struts that form the remainder of the framework are welded thereto. The preferred second frame member comprises a skin member that is configured for significantly contributing to the stiffness of the frame. The second frame member can additionally comprise a plurality of struts associated with the skin member that significantly stiffen the skin member itself and also the frame when the second frame member is associated with the first frame portion. In a most preferred embodiment, the struts of the first frame portion can be made of aluminum or an alloy thereof, and the skin member of the second frame portion comprises a plurality of skins, which can be made of a composite, fiber-reinforced material.

The first frame portion can be a lower frame portion disposed beneath the second frame portion which is an upper frame portion. Alternatively, the frame portions can have different dispositions with respect to each other, but can be opened to service or remove elements that are contained within the frame interior. This interior preferably has a volume that can contain operative portions of the vehicle preferably at least about 1,000 in$^3$, more preferably at least about 2,500 in$^3$, most preferably at least about 3,050 in$^3$. Most preferably, the volume is at most about 6,000 in$^3$, more preferably at most about 5,000 in$^3$. A preferred embodiment has a width of about 6-10 inches, a length of about 25-40 inches, and a height of about 15-25 inches.

Preferably, the lower frame portion includes a head tube that is configured to rotatably receive a steering tube mounted with a steerable wheel of the vehicle. For a vehicle frame intended for a scooter, for example, the frame and preferably the upper frame portion can define a stepthrough to allow the rider to pass a leg from one side of the frame to another when sitting thereon without lifting the leg high over the frame. Most preferably, the associated first and second frame portions have a longitudinal torsional stiffness that is increased compared to the longitudinal torsional stiffness of the first frame member by a factor between about 1.2 and 10.

A preferred embodiment of a vehicle constructed according to the invention includes the preferred frame and also a seat supportedly mounted on at least one of the frame portions, a plurality of wheels supportively associated with the frame, an energy source that is housed within the interior cavity of the frame, and a motor connected to the energy source and to at least one of the wheels for propelling the vehicle. The preferred vehicle is a two- or three-wheeled vehicle and thus comprises up to three wheels that movably support the vehicle, although other embodiments have more wheels. A suspension system connecting the wheels to the vehicle frame is also preferably provided, and may include at least one swing arm to supportively associate the frame with at least one of the wheels.

DETAILED DESCRIPTION OF THE PREFERRED EMBODIMENTS

Figure 1:
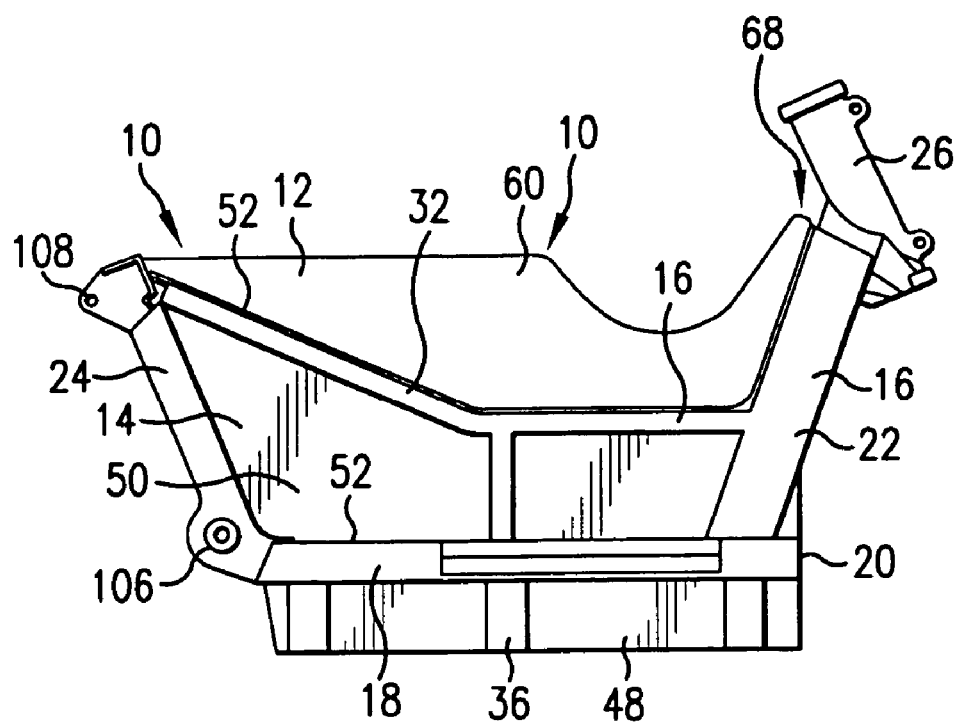
FIG. 1 is a side view of a preferred embodiment of a frame constructed according to the present invention.
Figure 2:
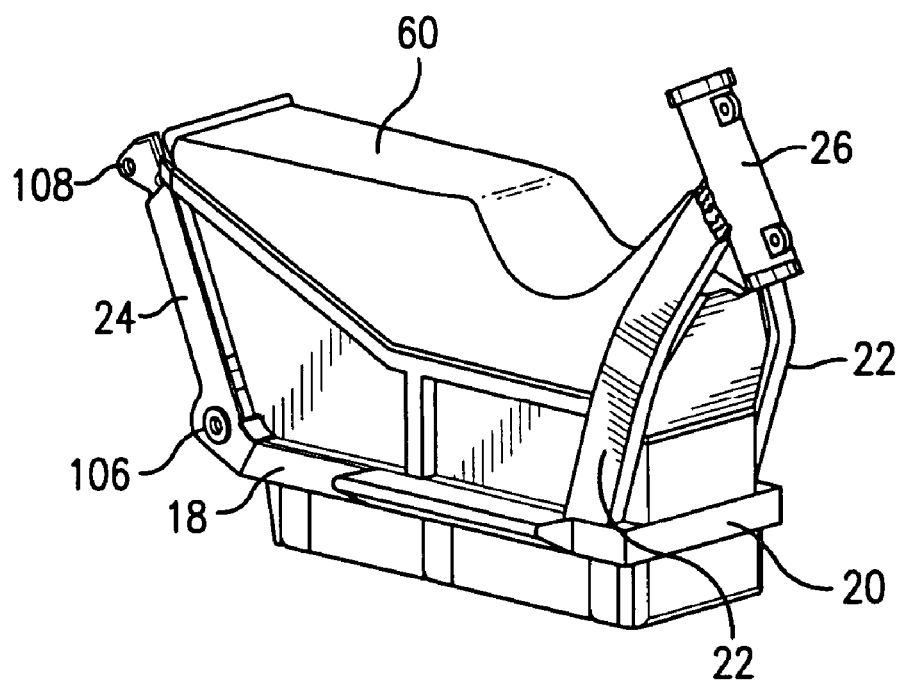
FIG. 2 is a perspective view thereof.
Figure 3:
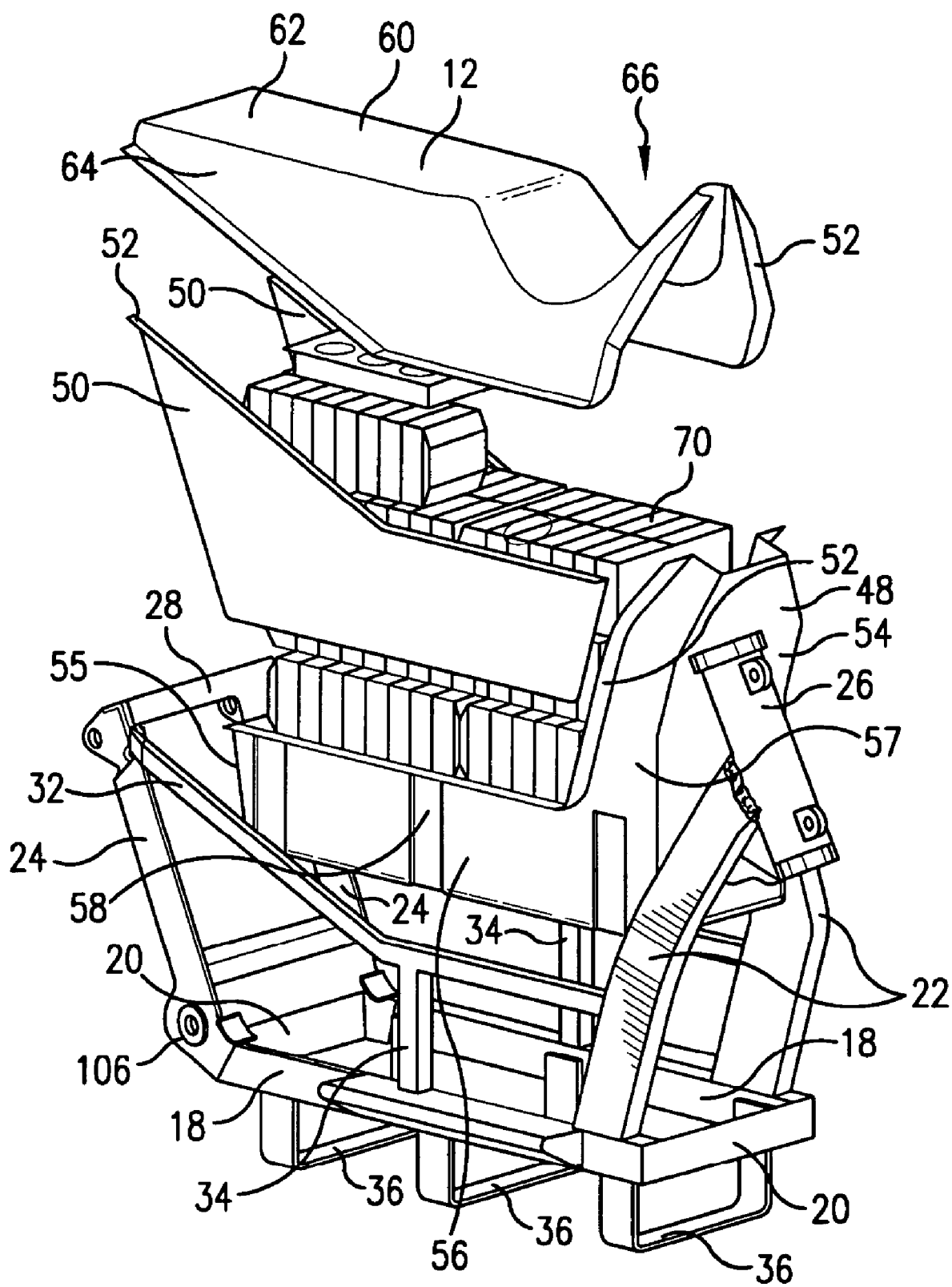
FIG. 3 is an exploded perspective view thereof.

Referring to FIGS. 1-3, the preferred embodiment of the invention is a scooter with a frame 10 that includes upper and lower frame portions 12,14. The lower frame portion 14 includes a plurality of struts 16 that are associated with each other to form a framework. The struts 16 are preferably welded to each other, but can alternatively be bolted, bonded, or otherwise coupled or attached to each other, preferably forming a rigid framework.

The struts can be made of any suitable material, preferably aluminum or an alloy thereof, such as extruded 6061-T6 aluminum alloy. Extended aluminum struts are preferably box extensions, such as with a rectangular cross-section. Other struts can be cast, and several struts can be of unitary construction.

The preferred framework includes side horizontal struts 18 extending longitudinally with respect to the scooter, and preferably near the bottom portion near the bottom of the frame. The side struts 18 are connected to front and rear lateral struts 20 and front and rear upright struts 22,24. The front upright struts 22 are connected at an upper end at a head tube 26, which is configured for rotatably receiving a steering tube to connect to a steerable wheel. The rear lateral strut 20 is preferably wide and curved to protect the bottom rear edge of the frame interior. Preferably, the rear upright struts 24 are also connected by another horizontal rear strut 28 disposed preferably near the lower end of the rear upright struts 24.

The framework also includes upper side struts 32, which are connected preferably with the upper ends of the rear upright struts 24, and midway along the front upright struts 22. The upper side struts 32 preferably include a bend generally midway along their length, rear, or at which they are connected to a vertical strut 34, which is connected midway along the bottom side struts 18. Additionally, the preferred embodiment has a plurality of bottom bracket struts 36, preferably three, which extend laterally across the framework, connecting the lower side struts 18. The bottom bracket struts 36 are configured to define a concave area facing upwards towards the interior of the framework to provide a bracket to support the contents of the frame.

Figure 4:
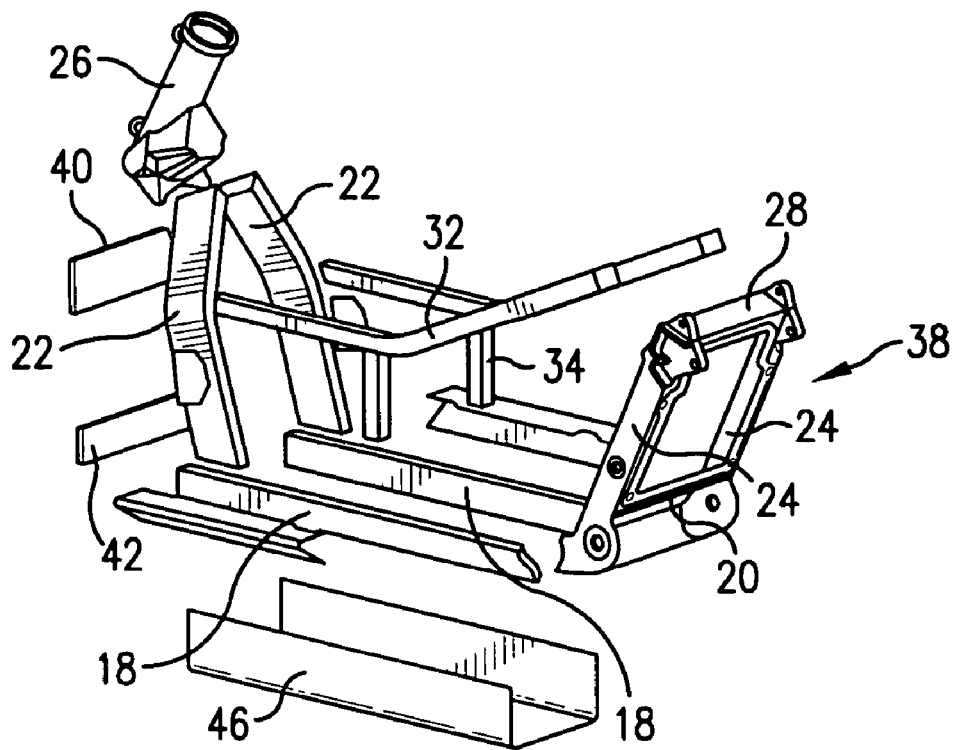
FIGS. 4 and 5 are exploded perspective and a side view of the lower frame portion, respectively, of another frame embodiment.

As shown in FIG. 4, the struts 16 can be manufactured as individual members that are welded to each other, or assemblies of several struts can be manufactured as unitary or integral parts and then attached to the remaining struts. For instance, in the embodiment of FIG. 4, rear struts 20,24,28 are cast as a single rectangular piece 38, which can also include attachments and pivots for other parts of the scooter, such as one or more swing arms. In addition, the embodiment of this figure has an additional strut, which is a laterally extending front cross-brace 40 that is welded midway vertically between the front upright struts 22, preferably near a bend in the struts 22 where struts 22 bend towards each other in an upward direction towards the head tube 26. The front lower strut 42 in this embodiment is also a cross brace or connecting strap welded to the front of the bottom side tubes 18.

Figure 5:
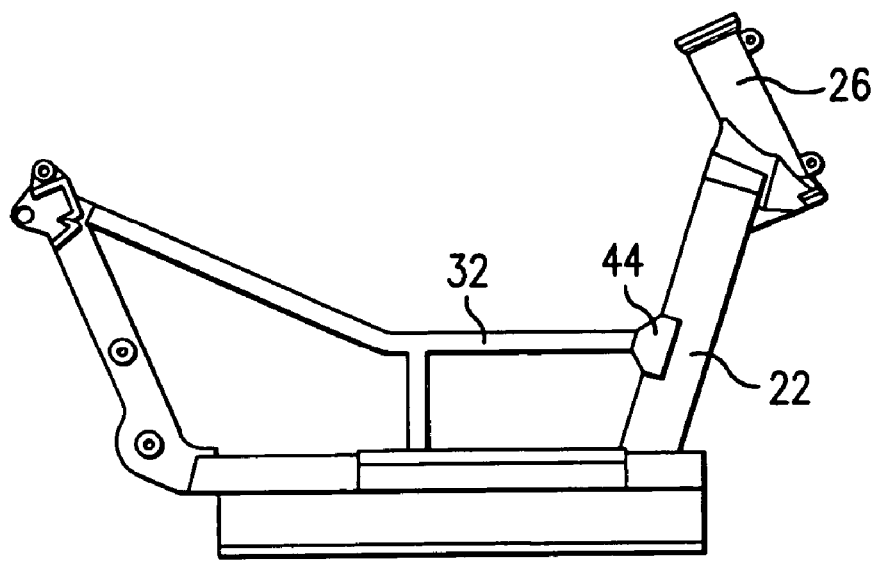

As shown in FIG. 5, spar doublers 44, such as webs, can be welded to strengthen joints between other pairs of struts, such as between side struts 32 and upright struts 22. In this embodiment, a single bottom bracket 46 is employed, which runs longitudinally along most or all of the length of the bottom of the frame.

Referring again to FIGS. 1-3, the lower frame portion also includes skin members 48,50. One or more of the skin members 48,50 are structurally associated with the framework, and preferably directly to the strut 16, to substantially and significantly increase the stiffness thereof, although in an alternative embodiment the skins of the lower frame portion are not structurally stiffening.

The preferred skin members 48,50 include flanges 52 extending preferable at an angle to the panels of the skin member, preferably at about a right angle. The flanges 52 are configured and positioned to abut and closely follow the shape of one or more struts 16 of the framework, such as the top sides of side struts 18,32. The skin members are preferably attached and coupled to the framework where they abut the framework, and most preferably along the flanges 52. The flanges 52 can be bolted at a plurality of locations along the length to the framework or attached and preferably coupled by other suitable means, but are preferably detachable therefrom for servicing. Skin member 48 forms a battery box and includes front, rear, bottom, and side portions 54-57. A structural connection between the skin member and the frame can also be provided by a snap-fit or a tight fit, such as between the battery tray 48 and the lower frame framework Preferably, extending along the side and bottom portions 56,57 of the skin member 48 are grooves 58 that are configured to receive bottom brackets 36 to provide an association to support and further stabilize and connect the skin member 48 to the framework.

The battery box or tray is configured for receiving and supporting a plurality of batteries stacked and arranged to preferably compactly fit within the frame. In the preferred frame, the interior space within the frame can be exposed to permit the entire battery box along with the batteries to be removed and replaced in the vehicle for servicing as needed.

Figure 6:
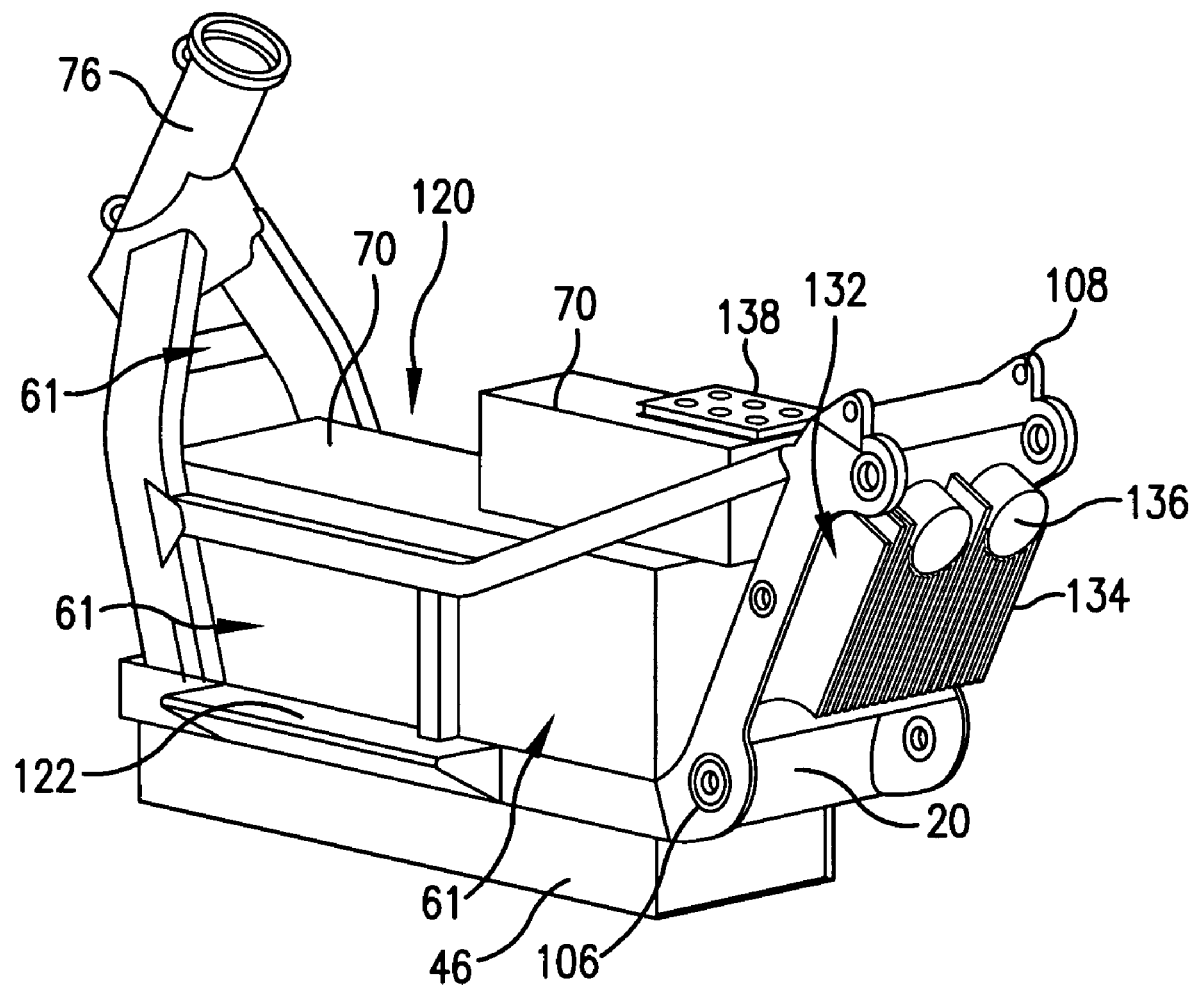
FIG. 6 is a rear perspective view of the lower frame portion thereof without the skin members.

The framework defines opening 61 between the struts 16, which are mostly or substantially entirely closed off by skin members. Preferably at least 75% of the openings are closed off, and more preferably at least about 90%. As shown in FIG. 6, the hollow interior 120 contains several sets of batteries 70 that are preferably encased in battery envelopes. Preferably, there are three layers of four battery envelopes apiece, although the entire set of batteries can be made as a monoblock in one embodiment. The batteries are connected to each other and to a controller 132, which controls the current flow to the motor depending on operator inputs that are made on controls, such as the throttle of the vehicle. The preferred controller includes cooling fins 134 that are preferably aligned in an upright direction to promote upward airflow along the fins 134, and the controller assembly can be used to close off the rear opening 61 between the rear frame members. Additionally, a set of capacitors 136 connected to the controller can also be positioned adjacent the cooling fins on the rear of the frame. An air circulation device, such as a fan assembly 138, is preferably positioned in fluid communication within the frame interior 120, such as below the seat supporting skin member of the upper frame portion and above the batteries 70 to circulate the air within the frame interior 120 as may be desired such as for cooling or venting. As shown, the batteries 70 are preferably aligned longitudinally, such that they present a narrow lateral profile. The batteries can be stacked vertically within the frame interior 120 as well. Thus, the batteries in the preferred frame do not protrude laterally beyond the foot rests 122. Skin members 50 include side panels configured for closing off the sides of the interior cavity of the frame, just as the skin member 48 closes off the front, bottom, and lower portions of the side or rear to protect the batteries, which can be nickel metal hydride or other suitable and preferably rechargeable battery type. In another embodiment, a different energy source can be housed within the frame, such as a fuel cell, a fuel tank, or combinations of several energy sources, which can include batteries. The rear skin portion is preferably attached to the rear of the frame to close off the gap between rear struts 20,24,28. The assembled frame and portions attached thereto preferably isolate the batteries and sensitive electronics or other parts in the frame interior.

An upper frame portion 12 comprises a structural skin 62 that includes unitary top and side panels 62,64, as well as a flange 52 for attachment to the lower frame portion. An access door can be provided in the upper skin member, or other skin members where needed. The upper frame portion 12 preferably is sufficiently stiff and strong to provide a seat support that is configured for attaching to a seat on which one or more riders are supported. In the forward section of the upper frame portion 12, a concave step-through area 66 is defined to facilitate mounting and unmounting of the scooter by a rider and to allow a rider's leg to pass across the step-through 66. The panel of the upper skin member 60 that defines the step-through 66 is thus concave on the outside of the frame, and preferably extends from the seat support upper panel 62 and head tube 26 when the frame is assembled.

As shown in FIG. 1, one or more gaps can be maintained between the upper skin member 60 and the lower frame portion 14, such as by providing a gap 68 at the top forward edge of the upper skin member 60. These gaps can promote ventilation of the frame interior.

Most preferably, the association of the upper frame portion 12 with the lower frame portion 14 is such that the upper frame portion 12 significantly increases the stiffness of the lower frame portion 14. The skin members of the upper and lower frame portions 12 and 14 can be made of the same or different materials. The skin members are preferably made of a composite, fiber-reinforced material such as fiberglass, carbon fiber, or another load-bearing material. Alternatively, the skin members can be made of aluminum or another metal or other material capable of being stressed to carry a load, and preferably a torsional frame load.

Figure 7:
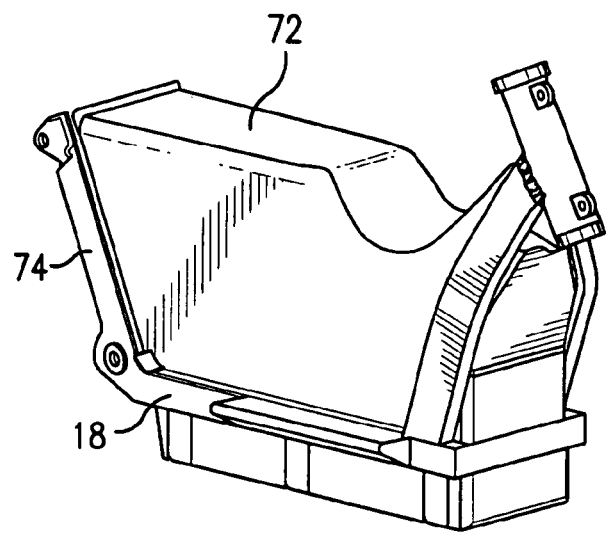
FIGS. 7 and 8 are a perspective and an exploded perspective view, respectively, of yet another embodiment of the invention.
Figure 8:
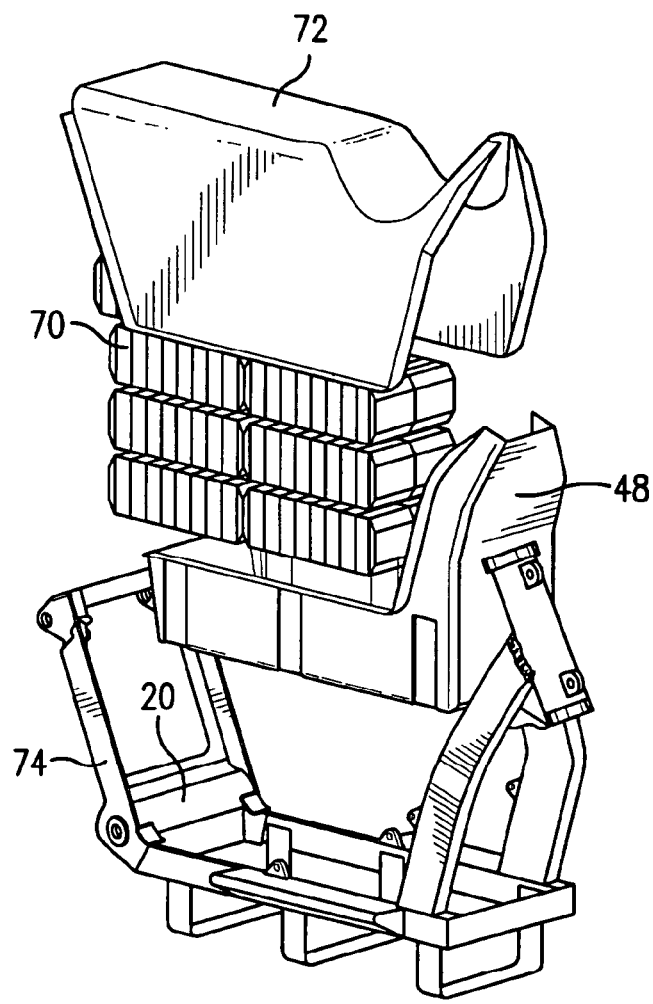

Referring to FIGS. 7 and 8, another embodiment of the frame includes an upper fame portion 72 that extends along more than two-thirds of the vertical height of the sides of the frame. Additionally, the lower frame portion 74 does not include any additional side struts above the bottom horizontal struts 18. The embodiment of FIGS. 9-12 also has an upper frame portion 76 that extends vertically along the greater part of the sides of the frame. Additionally, the upper frame portion 76 includes skin member 78, which can include one or more separate portions and which is fixed to longitudinal and vertical side struts 80,82. The side struts 80,82 stiffen the lateral sides of the upper frame portion and provide the attachment to the lower frame portion 84. Lower frame portion 84 preferably includes tangs 86 configured for bolting directly to the ends of the side struts 80,82 of the upper frame portion 76 to allow the upper and lower frame portions to contribute to the stiffness of each other.

Figure 9:
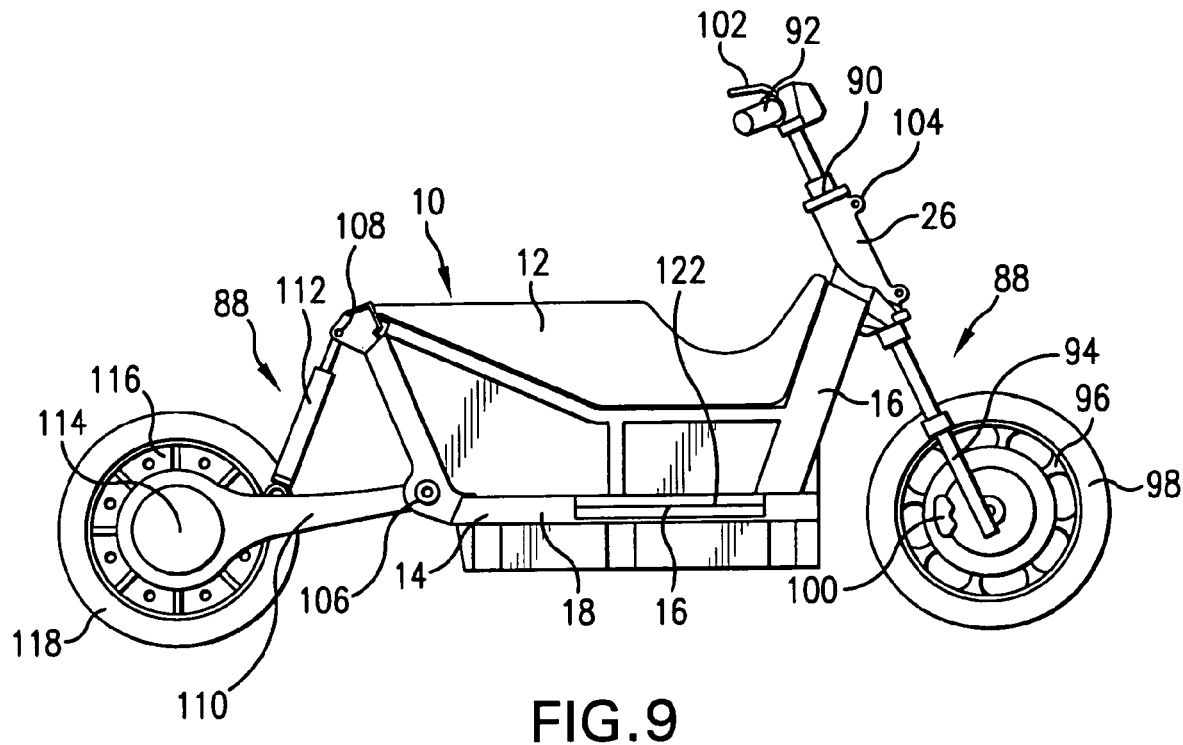
FIG. 9 is a side view of another embodiment of the frame supported by wheels and a suspension system.
Figure 10:
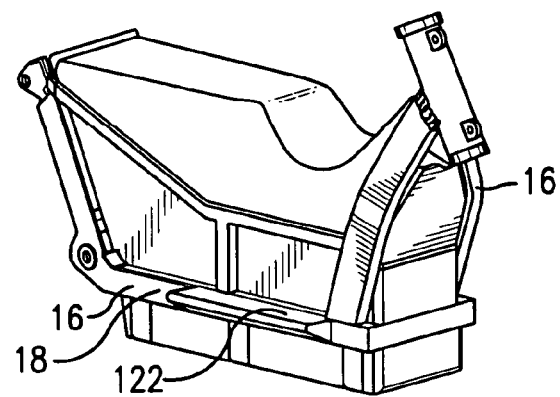
FIG. 10 is a perspective view of the frame embodiment of FIG. 8 by itself.
Figure 11:
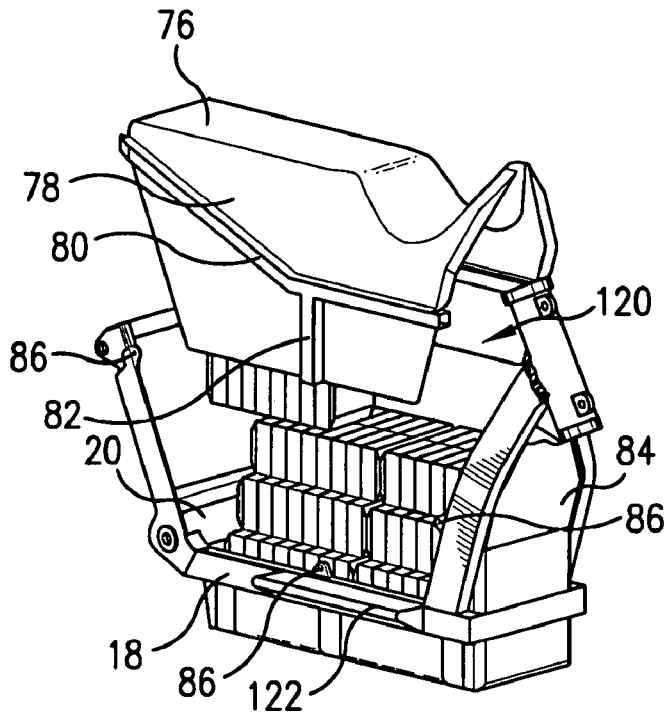
FIGS. 11 and 12 are exploded perspective and side views respectively thereof.
Figure 12:
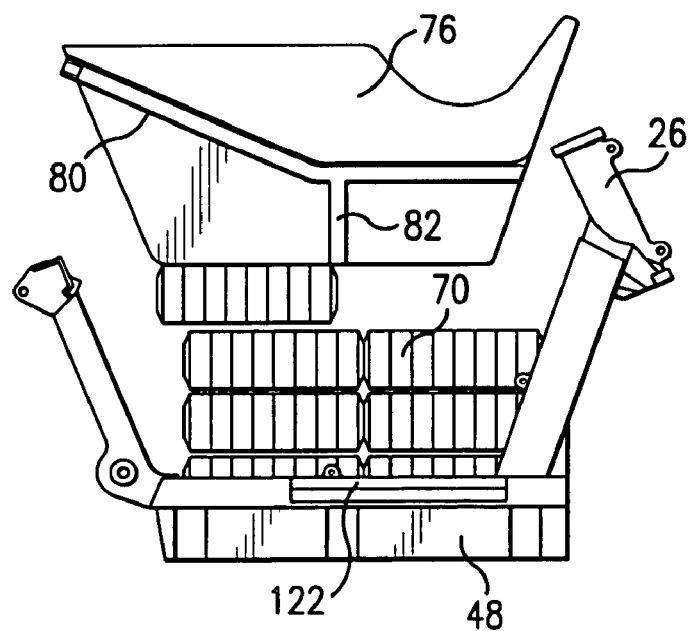

FIG. 9 shows the frame mounted to a suspension assembly 88, connecting the frame to wheels 96,116 that provide support to the frame. A steering tube 90 is rotatably received through the head tube 26 and is attached to handlebars 92 to allow the rider to steer the vehicle, the steering tube 90 is also connected to a fork 94, which can include a shock absorber, the fork 94 is mounted to a wheel 96, which has a tire 98. A brake 100 can be provided, which can be controlled by brake lever 102.

Additional bolt holes 104 or other attachment members are provided on the frame to connect to fairings and other portions of the vehicle. Mounting brackets 106,108 are provided on the rear of the frame, preferably on the rear upright struts 24, to supportively attach to a suspension system, which preferably includes one or more swing arms 110 and shock absorbers 112. A motor 114 is preferably mounted within one of the swing arms 110, and is preferably coaxial with wheel 116, which is driven by the motor 114 and which has a tire 118 mounted thereon. In the assembly shown, the frame encloses and protects the batteries and other components disposed in the frame interior 120, which can additionally include electronics, such as the controller for the driving and braking of the vehicle. A brake can also be provided on the rear wheel 116. The bottom of the frame, including skin member 48, also protects against impact with road debris. Also, a pair of foot rests 122 is welded to the frame, such as to the lower longitudinal side struts 18, to support a rider's feet.

Figure 13:
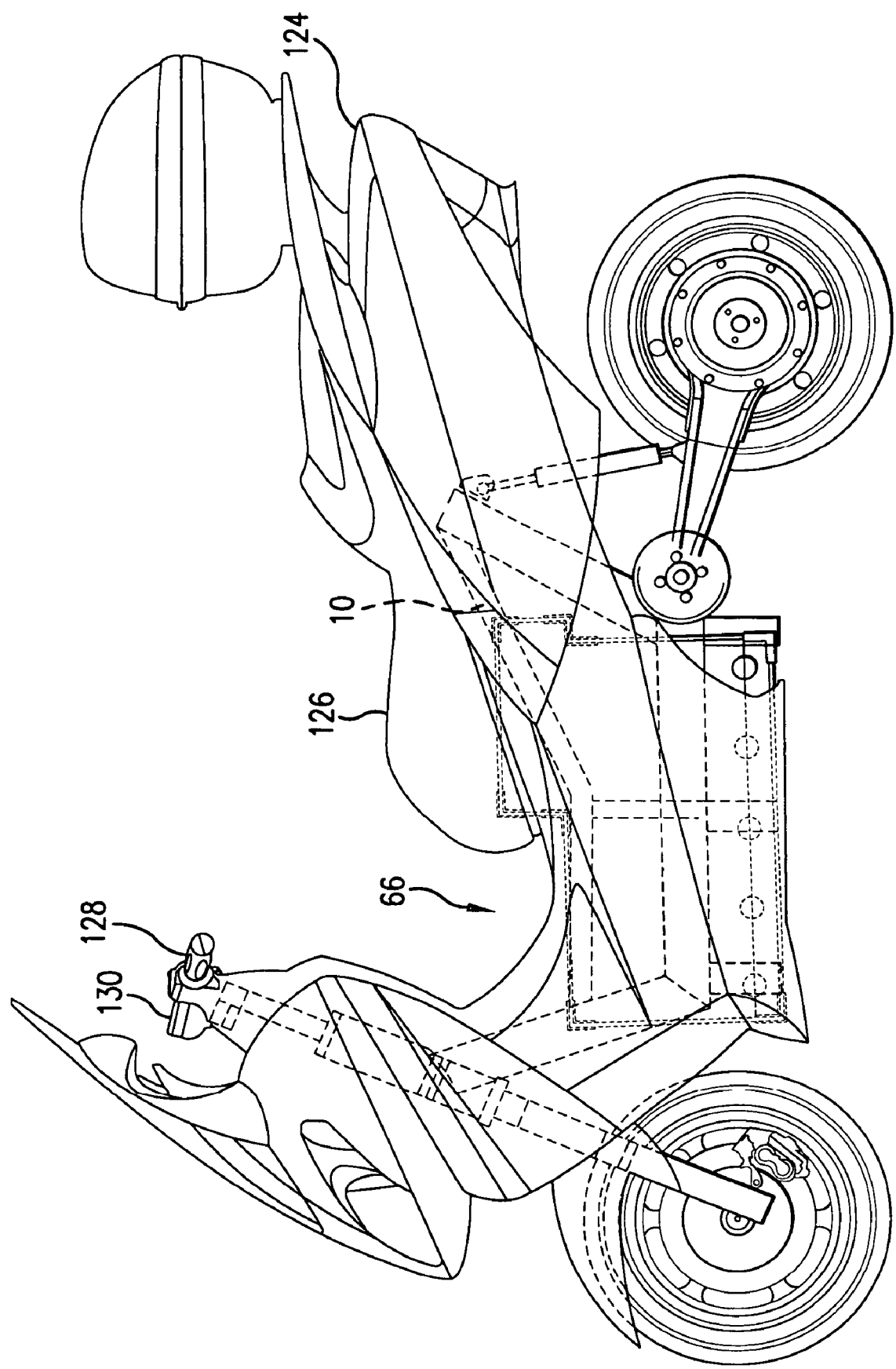
FIG. 13 is a side view showing an assembled scooter using an embodiment of the frame of the present invention.

Referring to FIG. 13, a preferred embodiment of the frame 10 is shown attached to fairings, body panels, and accessories 124 of the vehicle. A seat 126 is directly supported by the upper portion of the frame. A throttle 128, gauges, and controls 130 are provided for the rider to operate and control various functions of the vehicle and to monitor the status of the vehicle, such as the battery charge condition.

The upper frame portion of the preferred embodiments preferably provides a significant contribution to the overall stiffness of the frame. A finite element model of the embodiment shown in FIGS. 1-3 was used to determine the structural contribution of a composite upper skin member 60 to the frame, in which the struts are formed of an aluminum alloy. The model was constrained at the swing-arm pivots 106, and force loads were applied at the upper and lower steering head bearings of the head tube 26. A 100 pound-load to the right was applied to the lower bearing, and a leftward 100-pound load was applied to the upper bearing. These loads amounted to a 1,100 in.-lb. moment at the head tube. Analyses were first run for the aluminum lower framework only, then for the framework with the attached battery box 48, and finally or the aluminum framework with the battery tray 48 and upper frame portion attached. In this embodiment, the battery tray 48 and upper skin member 60 are made of five layers of 0.010 inch fiberglass fabric/epoxy prepreg material, for a total thickness of 0.050 inches.

In this analysis, 0.537 degrees of deflection was measured in the aluminum framework by itself. With the aluminum framework combined with the fiberglass battery tray, 0.265° of deflection was measured. Finally, with the aluminum framework, the coupled battery tray, and the coupled upper frame portion, a deflection of 0.0863° was measured. Additionally, it was determined that the upper frame member of this embodiment increased the torsional rigidity of the frame by a factor of about 3 compared to the torsional rigidity of only the lower frame portion by itself.

In the preferred embodiments, the upper frame portion increases the stiffness of the frame when it is associated with the lower frame portion, and preferably the torsional stiffness, most preferably about a substantially longitudinal axis extending front to back. The torsional stiffness of the frame is preferably increased by a factor of at least about 1.2, more preferably at least about 1.5, more preferably at least about 2.0, more preferably at least about 2.5, compared to the torsional stiffness of the lower frame portion alone. Most preferably, the improvement in strut and stiffness provided by the upper frame member is less than a factor of about ten and more preferably less than a factor of about six.

In certain embodiments, the bending stiffness of the frame can also be substantially improved by the coupled upper frame portion. In an alternative embodiment, the upper frame portion can include a rigid framework of struts, which is preferably torsionally stiffened by skim members. As seen, for example in FIGS. 1 and 13, the upper side struts 32 run longitudinally and are spaced from each other substantially on opposite sides of the hollow interior cavity 120. The lower frame portion 14 of this embodiment is supported on the vehicle wheels such that the upper side struts 32 are in compression, and the upper frame portion 12 extends over and across the interior cavity 120 and is structurally associated with the longitudinal portions for substantially increasing the stiffness thereof.

The general configuration of the preferred frame includes the generally horizontal and preferably flat upper surface of the upper frame member where the seat is attached and supported. The stepthrough and the frame is provided to enable the complete stepthrough including fairings and the assembled scooter to have a height of less than about 75% of the height of the seat above the foot rests. The preferred rear and front upright struts are inclined rearwards and forwards, respectively, in an upward direction, and the head tube is inclined forward a downward direction. Additionally, the rear of the upper side struts are inclined upwards towards the rear of the frame, while the forward portion thereof is generally horizontal. The preferred width of the frame interior or of the frame excluding the footrests is preferably at least about 4 inches, more preferably at least about 6 inches, preferably at most about 10 inches, more preferably at most about 9 inches at the stepthrough. With fairings, the preferred width is at least about 7 inches and at most about 12 inches at the stepthrough preferably where the rider sits or where his legs are placed. The front upright struts are also preferably configured to provide a narrower width at the top than at the bottom of the frame, as the preferred battery arrangement and the upper levels of the frame interior positions the batteries towards the rear of the frame.

The embodiments described above are for a scooter. In other embodiments, the frame may be for a motorcycle, a three-wheel vehicle, or even a four-wheel vehicle, although vehicles with three or fewer wheels are preferred. Additionally, the frame embodiments preferably provide for seating the rider on top of the frame, straddling the sides thereof.

While illustrative embodiments of the invention are disclosed herein, it will be appreciated that numerous modifications and other embodiments may be devised by those skilled in the art. Therefore, it will be understood that the appended claims are intended to cover all such modifications and embodiments that come within the spirit and scope of the present invention.

What is claimed is:

1. An electric vehicle, comprising:
   a vehicle frame, comprising:
   a lower frame portion that comprises a plurality of struts, each strut having first and second ends that are attached to at least an end of another one of the struts to form a lower strut-framework and a skin member covering openings between the first and second ends of the struts, and
   an upper frame portion comprising a skin member associable with the lower framework in a stiffening association for significantly increasing the stiffness of the lower framework,
   wherein the associated lower framework and upper frame portion cooperatively define and substantially enclose an interior cavity therebetween, the struts comprising:
   a first group of struts disposed to one lateral side and defining a lateral portion of the cavity, and
   a second group of struts disposed to an opposite lateral side of the cavity from the first group and defining another lateral portion of the cavity;
   a seat supportedly mounted on the upper frame portion above the cavity;
   a plurality of wheels supportively associated with the lower framework;
   an electrical energy source housed in the interior cavity; and
   a electric motor connected to the energy source for receiving propulsive energy therefrom, and connected to at least one of the wheels for propelling the vehicle using the propulsive energy.

2. The vehicle of claim 1, wherein the energy source comprises a battery, the assembled frame has a torsional stiffness, and the skin member of the lower frame portion comprises a battery tray that is configured for supporting the battery to significantly increase the torsional stiffness of the assembled frame, the upper and lower frame portions being configured for allowing removal of the battery tray from the interior cavity when the upper and lower frame portions are separated, wherein the assembled frame portions are configured for substantially enclosing the battery.

3. The vehicle of claim 1, wherein first and second group each comprises a longitudinal strut that runs generally longitudinally, the longitudinal struts being spaced from each other substantially on opposite lateral sides of the interior cavity, the first frame portion being supported on the wheels such that the longitudinal struts are in compression, and the second frame portion extends over and across the interior cavity and is structurally associated with the longitudinal portions for substantially increasing the stiffness thereof.

4. The vehicle of claim 1, wherein the plurality of struts comprises additional struts connecting the first and second groups of struts and being disposed on at least one longitudinal side of the cavity.

5. A vehicle frame, comprising:
a first frame portion having a first frame portion stiffness and being configured for connecting to at least one vehicle wheel;
a second frame portion having a second frame portion stiffness and being configured for supporting a rider seat, the second frame portion being separably associable with the first frame portion in a stiffening association to cooperatively provide an assembled frame that has a frame stiffness that is significantly greater than a first and second stiffnesses independently;
wherein the assembled frame is configured such that the second frame portion is supported by the first frame portion;
wherein the first and second frame portions of the assembled frame cooperatively:
define and substantially enclose an interior cavity dimensioned for housing an electrical energy-source for providing propulsive energy to a propulsion system for propelling the vehicle, and
include a strut framework that comprises a plurality of supportive struts, which struts each have first and second ends that are each attached to at least one of the ends of another one of the struts, such that the framework provides a major portion of the support of the rider on the wheel;
wherein the struts include first and second lateral groups of the struts disposed on and defining opposite lateral side of the cavity.

6. The vehicle frame of claim 5, wherein each lateral group includes upper and lower struts disposed one above the other and extending generally longitudinally along the first and second sides.

7. The vehicle of claim 6, wherein the assembled frame is configured for being supported on the first wheel and a second wheel, which is disposed on an opposite longitudinal side of the frame from the first wheel, such that the upper struts are in compression, and the second frame portion extends over and across the interior cavity and is structurally associated with the longitudinal portions for substantially increasing the stiffness thereof.

8. The vehicle of claim 6, wherein the upper struts are disposed along an upper half of the interior cavity, and the lower struts are disposed along a lower half of the interior cavity.

9. The vehicle of claim 5, wherein the first and second lateral groups are connected to each other by others of the struts that extend substantially laterally and disposed on and defining at least one longitudinal side of the cavity.

10. The vehicle of claim 9, wherein the longitudinal side includes front and rear longitudinal sides.

11. The vehicle of claim 5, wherein the first frame portion comprises the strut framework.

12. The vehicle of claim 5, wherein the first frame portion includes some of the struts of the framework, and the second frame portion defines others of the struts of the framework, wherein at least some of the ends of the struts of the first frame portion are coupled at least some of the ends of the struts of the second frame portion in the assembled frame.

13. The vehicle frame of claim 5, wherein the assembled frame comprises a structural skin member that is structurally associated with a plurality of the struts for significantly increasing the torsional stiffness thereof and for closing at least portions of openings defined between the plurality of struts.

14. The vehicle frame of claim 13, wherein the structural skin member comprises a plurality of structural skin members structurally associated with different pluralities of struts for substantially increasing the torsional stiffness thereof.

15. The vehicle frame of claim 14, wherein the skin members of the first frame portion comprise a battery tray inside the interior cavity configured for supporting a battery sufficiently large to provide propulsive energy to power the propulsion system, the battery tray being associated with the first framework for significantly stiffening the first framework.

16. The vehicle frame of claim 15, wherein first and second frame portions are associated in the assembled frame such that the second frame portion is separable from the first frame portion for permitting access to the battery in the battery tray.

17. The vehicle frame of claim 5, wherein the struts comprise at least one concave bracket configured for receiving and supporting a bottom portion of a battery tray sufficiently large to provide propulsive energy to power the propulsion system.

18. The vehicle frame of claim 5, wherein a plurality of the struts are welded to each other at the first and second ends.

19. The vehicle frame of claim 5, wherein the struts comprise a rear group of struts that are formed in a unitary piece and cooperatively define an open rear wall of the vehicle.

20. The vehicle frame of claim 5, wherein the strut framework is made of aluminum or an alloy thereof, and the second frame portion comprises a skin member made of a composite, fiber-reinforced material.

21. The vehicle frame of claim 5, wherein in the assembled frame the first frame portion is a lower frame portion disposed beneath the second frame portion, which is a lower frame portion, wherein the first vehicle wheel is a rear vehicle wheel, the first frame portion being configured for connecting to a front vehicle wheel for supporting the second frame portion and rider thereon from the front and rear vehicle wheels.

22. The vehicle frame of claim 21, wherein the lower frame portion comprises a head tube configured to rotatably receive a steering tube that is mounted with one of the wheels, which is a steerable wheel of the vehicle.

23. The vehicle frame of claim 21, wherein:
the first frame comprises front and rear connection portions that are respectively configured for mounting from the front and rear wheels;
wherein the second frame portion in the assembled frame increases the torsional stiffness of the first frame portion by a factor of between about 1.2 and 10 measured between the front and rear connection portions.

24. An electric vehicle, comprising:
the vehicle frame of claim 23;
a seat supportedly mounted on the second frame portion;
the wheels, which are supportively associated with the assembled frame by the connecting portions;
the energy-source housed in the interior cavity; and
an electric motor connected to and powered by the energy source and connected to at least one of the wheels for propelling the vehicle.

25. The vehicle of claim 24, wherein the wheels comprise up to three wheels.

26. The vehicle of claim 25, further comprising a suspension system including a swing arm that supportively connects at least one of the wheels to the rear connecting portion.

27. The vehicle frame of claim 5, wherein the assembled frame defines a step-through to provide a scooter frame.

28. The vehicle frame of claim 5, wherein the interior cavity has a volume of at least about 1,000 in$^3$ to contain the energy-source.

29. The vehicle frame of claim 5, wherein the interior cavity has a volume of at least about 2,500 in$^3$ to contain the energy-source.

30. The vehicle frame of claim 29, wherein the interior cavity has a height of at least about 15 inches, a width of at least about 6 inches, and a length of at least about 25 inches.

31. The vehicle frame of claim 5, wherein the first and second frame portions of the assembled frame cooperatively substantially enclose at least top, bottom, front, and lateral sides of the interior cavity.

\* \* \* \* \*